US006247915B1

(12) United States Patent
Miyazaki

(10) Patent No.: US 6,247,915 B1
(45) Date of Patent: Jun. 19, 2001

(54) DIE FOR MANUFACTURING HONEYCOMB BODIES

(75) Inventor: Makoto Miyazaki, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/429,627

(22) Filed: Oct. 29, 1999

(30) Foreign Application Priority Data

Oct. 29, 1998 (JP) .......................................... 10-308803

(51) Int. Cl.[7] .......................................... B29C 47/12
(52) U.S. Cl. .................... 425/380; 425/382 R; 425/462; 425/463
(58) Field of Search .............................. 425/380, 382 R, 425/463, 467, 462

(56) References Cited

U.S. PATENT DOCUMENTS 4,178,145 * 12/1979 Hamamoto et al. ................ 425/467
4,242,075 * 12/1980 Higuchi et al. ...................... 425/463
4,298,564 * 11/1981 Higuchi et al. ................. 425/382 R
4,550,005 * 10/1985 Kato ..................................... 425/380
5,552,102 * 9/1996 Krangle ................................ 425/463
5,876,804 * 3/1999 Kodama et al. ..................... 425/462
5,942,260 * 8/1999 Kodama et al. ..................... 425/380

* cited by examiner

*Primary Examiner*—Tim Heitbrink
(74) *Attorney, Agent, or Firm*—Parkhurst & Wendel, LLP

(57) ABSTRACT

A die for manufacturing honeycomb bodies includes batch supply holes which are opened to a backside surface of the die, slit channels which are communicated with the batch supply holes and are opened to a foreside surface of the die and a taper worked portion which is formed by working an outer peripheral portion of the foreside surface of the die in a taper manner. In the die mentioned above, at least one cut-out portion is formed to the taper worked portion of the outer peripheral portion.

6 Claims, 3 Drawing Sheets

DIE FOR MANUFACTURING HONEYCOMB BODIES

BACKGROUND OF THE INVENTION

1. Field of the Invention

The present invention relates to a die for manufacturing honeycomb bodies used for extruding honeycomb structural bodies.

2. Description of Related Art

Generally, various kinds of dies for manufacturing honeycomb bodies are known, which comprise; a die main body including batch supply holes which are opened to a backside surface of the die, slit channels which are communicated with the batch supply holes and are opened to a foreside surface of the die and a taper worked portion which is formed by working an outer peripheral portion of the foreside surface of the die in a taper manner; and a control plate arranged at a portion opposed to the taper worked portion.

FIG. 3 is a schematic view showing one embodiment of a known die for manufacturing honeycomb bodies. In the embodiment shown in FIG. 3, a die 51 for manufacturing honeycomb bodies comprises a die main body 52 and a control plate 53. The die main body 52 has a disk-shape and comprises batch supply holes 61 which are opened to its backside surface (lower surface (not shown) in FIG. 3) and slit channels 62 which are opened to its foreside surface (upper surface in FIG. 3). The slit channels 62 have a crisscross shape at the foreside surface of the die main body 52, and the batch supply holes 61 are communicated with alternate intersection points. An outer peripheral portion of the die main body 52 is worked into a taper shape to form a taper worked portion 63. The control plate 53 is connected to the die main body 52 via a spacer 64 in such a manner that one surface 53*a* is opposed (parallel in FIG. 3) to the taper worked portion 63.

In the die 51 for manufacturing honeycomb bodies having the construction shown in FIG. 3, a ceramic batch for example is supplied from the batch supply holes 61 which are opened to the backside surface of the die 51, and the thus supplied ceramic batch is extruded from the slit channels 62 which are opened to the foreside surface of the die 51, so as to obtain a honeycomb structural body. Then, it is possible to reduce an inward batch stress when an outer wall is formed and to prevent a collapsing of outer cells i.e. a generation of wrinkle portions in the honeycomb structural body by forming the taper worked portion 63 at the outer peripheral portion of the die main body 52 and by arranging the control plate 53 at a portion opposed to the taper worked portion 63.

However, if a thin wall honeycomb structural body having a thin rib thickness, which is required recently, is to be formed, an isostatic strength of the honeycomb structural body become smaller correspondingly since the rib thickness is thin. As a result, there is a drawback such that it is necessary to take care of a handling of the honeycomb structural body. In order to eliminate the drawback mentioned above, it is thinkable in the die 51 for manufacturing honeycomb bodies having the construction shown in FIG. 3 that a space between the taper worked portion 63 and the control plate 53 is widened by making a thickness of the spacer 64 thick so as to obtain a honeycomb structural body having a thick outer wall. However, if the thick outer wall is to be formed in this manner, a batch is supplied in excess at this portion to an extent such that the outer wall becomes thicker. In addition, when the outer wall is formed, a pressure of the batch moving between the taper worked portion 63 and the control plate 53 becomes large and is applied in an inward direction of the honeycomb structural body. As a result, there is a drawback such that outer ribs are deformed and a collapsing of the outer cells i.e. a wrinkle portion is generated.

SUMMARY OF THE INVENTION

An object of the present invention is to eliminate the drawbacks mentioned above and to provide a die for manufacturing honeycomb bodies in which a generation of wrinkle portions in a honeycomb structural body after forming can be prevented and a thickness of an outer wall can be thicker.

According to the invention, a die for manufacturing honeycomb bodies including batch supply holes which are opened to a backside surface of the die, slit channels which are communicated with the batch supply holes and are opened to a foreside surface of the die and a taper worked portion which is formed by working an outer peripheral portion of the foreside surface of the die in a taper manner, comprises at least one cut-out portion formed to the taper worked portion of the outer peripheral portion.

In the present invention, it is possible to reduce a pressure of the batch moving between the taper worked portion and the control plate by arranging the cut-out portion to the taper worked portion of the outer peripheral portion. As a result, it is possible to reduce a pressure applied to the rib even if the outer wall is designed thick, and thus it is possible to obtain a ceramic honeycomb structural body in which a generation of wrinkle portions in a honeycomb structural body after forming can be prevented and a thickness of an outer wall can be thicker. In the case that the cut-out portion is constructed in a longitudinal cross section by a horizontal surface along a radial direction of the die and a vertical surface along an axial direction of the die, or, in the case that the taper worked portion has an angle of 45° with respect to a surface along a radial direction of the die, and the horizontal surface and vertical surface constituting said cut-out portion are 0.2–1.0 mm in a longitudinal cross section, these cases are preferred since a function of the cut-out portion can be exerted effectively.

DESCRIPTION OF THE PREFERRED EMBODIMENT

Figure 1:
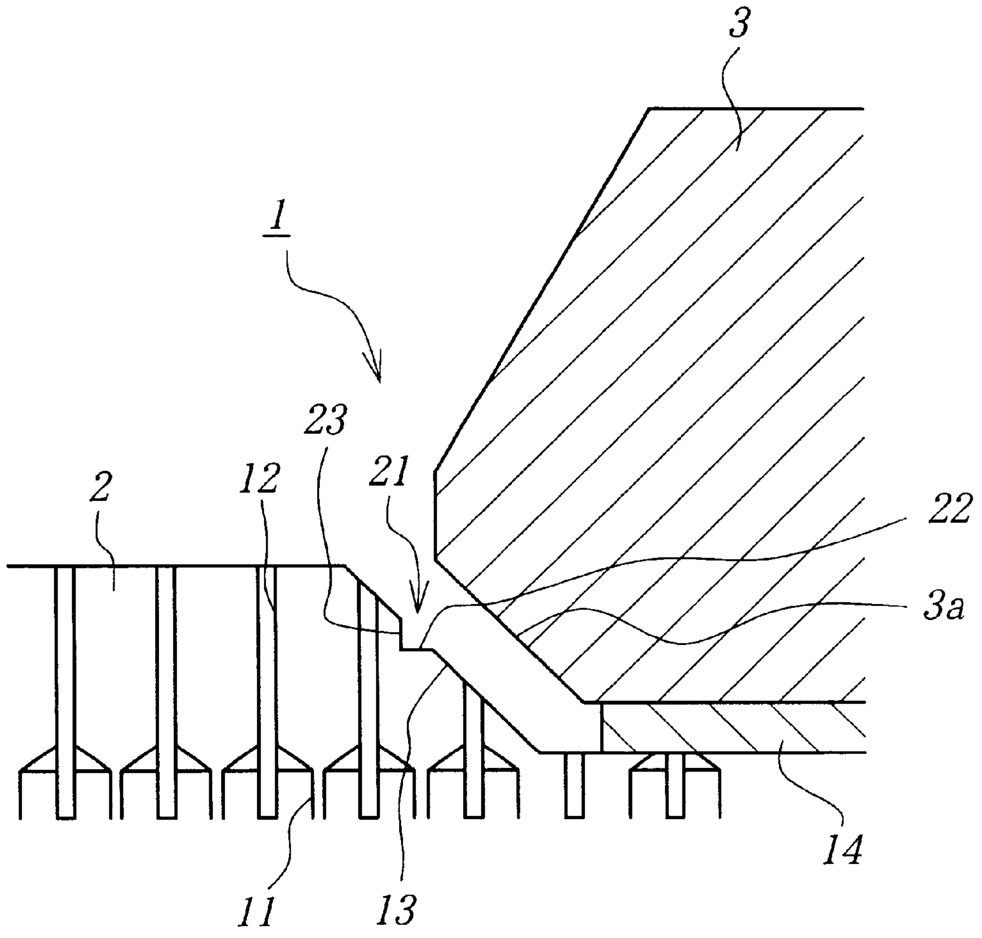
FIG. 1 is a schematic view showing one embodiment of a die for manufacturing honeycomb bodies according to the invention.

FIG. 1 is a schematic view showing one embodiment of a die for manufacturing honeycomb bodies according to the invention. In the embodiment shown in FIG. 1, a die 1 for manufacturing honeycomb bodies comprises a die main body 2 and a control plate 3. The die main body 2 has a disk-shape and comprises batch supply holes 11 which are opened to its backside surface (lower surface (not shown) in FIG. 1) and slit channels 12 which are opened to its foreside surface (upper surface in FIG. 1). The slit channels 12 have a crisscross shape at the foreside surface of the die main body 2, and the batch supply holes 11 are communicated with alternate intersection points. An outer peripheral portion of the die main body 2 is worked into a taper shape to form a taper worked portion 13. The control plate 3 is connected to the die main body 2 via a spacer 14 in such a manner that one surface 3*a* is opposed (parallel in FIG. 1) to the taper worked portion 13.

The construction of the die 1 for manufacturing honeycomb bodies according to the invention mentioned above is the same as that of the known die for manufacturing honeycomb bodies. A different point between the die 1 according to the invention and the known die is that a cut-out portion 21 is formed to the taper worked portion 13 of the peripheral portion of the die main body 2 at a portion other than the slit channels 12. The cut-out portion 21 is constructed in a longitudinal cross section as shown in FIG. 1 by a horizontal surface 22 along a radial direction of the die 1 and a vertical surface 23 along an axial direction of the die 1. The cut-out portion 21 may be arranged to all of a circumference of the taper worked portion 13 and may be arranged to a part of a circumference of the taper worked portion 13 if necessary. Moreover, in the embodiment mentioned above, the cut-out portion 21 is constructed by the horizontal surface 22 and the vertical surface 23 and a cross section thereof is a rectangular shape. Further, the number of the cut-out portion 21 is one. However, it is a matter of course that the cross section and the number of the cut-out portion 21 may be varied if necessary so as to achieve the die 1 having another conditions.

In the die 1 for manufacturing honeycomb bodies according to the invention, since the cut-out portion 21 is arranged at a predetermined position as mentioned above, it is possible to reduce a pressure of the batch moving between the taper worked portion 13 and the control plate 3 by expanding the batch at the cut-out portion 21. Therefore, it is possible to reduce a pressure of the batch only by passing the batch through the cut-out portion 21 while an amount of the batch defining a thickness of the outer wall is maintained constantly. As a result, in the honeycomb structural body formed by using the die 1 for manufacturing honeycomb bodies according to the invention, it is possible to make a thickness of the outer wall thick under the condition such that wrinkle portions near the outer peripheral portion is prevented.

Hereinafter, an actual experiment will be explained.

Figure 2A:
FIGS. 2*a* and 2*b* are schematic views illustrating respectively a comparative example and an example of the present invention used in an experiment.
Figure 2B:
Figure 3:
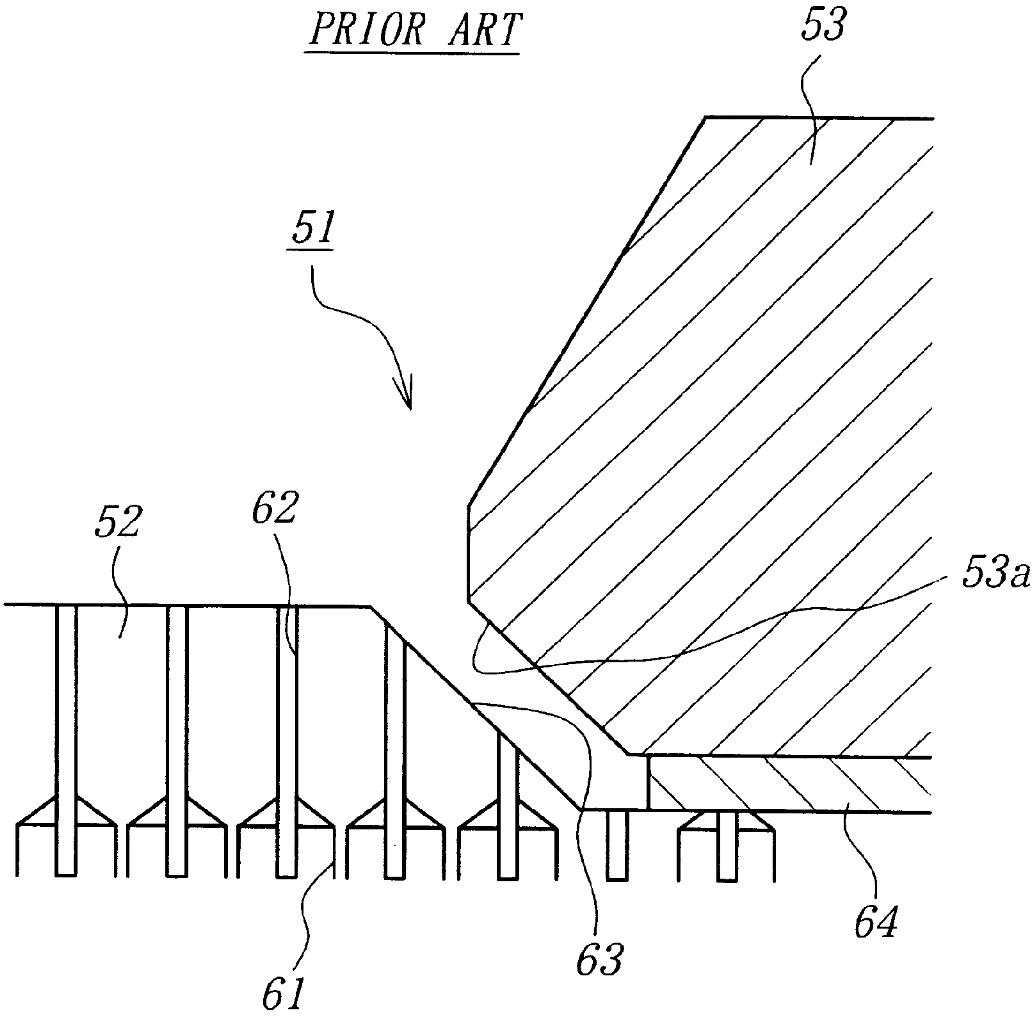
FIG. 3 PRIOR ART
FIG. 3 is a schematic view depicting one embodiment of a known die for manufacturing honeycomb bodies.

Actually, ceramic honeycomb structural bodies, made of cordierite as a main ingredient, having a dimension of diameter: 103 mm, length: 100 mm, wall thickness: 3 mil, cell number: 400 cpsi, and having a thick outer wall of 0.4 mm were extruded by using dies according to a comparative example and examples 1–5 to form ceramic honeycomb structural bodies. Then, with respect to the thus formed ceramic honeycomb structural bodies, ISO (isostatic) strengths in a radial direction were measured and compared. Here, as a comparative example, use was made of a die having no cut-out portion as shown in FIG. 2*a*. As examples 1–5 according to the invention, use was made of dies having the cut-out portion in the taper worked portion having a rectangular cross section as shown in FIG. 2*b*. In the examples 1–5, lengths of the horizontal surface and the vertical surface were set to 0.1 mm, 0.2 mm, 0.5 mm, 1.0 mm and 1.5 mm respectively as shown in the following Table 1. The results of the experiment are shown in the following Table 1.

TABLE 1

| Sample No. | Appearance after forming | ISO strength |
|---|---|---|
| Comparative example (no cut-out) | Wrinkle portion generation at all of outer peripheral portion | less than 10 kg/$cm^2$ |
| Example 1 (cut-out 0.1 mm) | Wrinkle portion generation at part of outer peripheral portion | less than 10 kg/$cm^2$ |
| Example 2 (cut-out 0.2 mm) | good | more than 10 kg/$cm^2$ |
| Example 3 (cut-out 0.5 mm) | good | more than 10 kg/$cm^2$ |
| Example 4 (cut-out 1.0 mm) | good | more than 10 kg/$cm^2$ |
| Example 5 (cut-out 1.5 mm) | No wrinkle portion, but bad wall connection | less than 10 kg/$cm^2$ |

From the results shown in the Table 1, it is understood that a generation of wrinkle portions at the outer peripheral portion of the examples 1–5 is less than that of the comparative example, if the examples 1–5 having the cut-out portion in the taper worked portion are compared with the comparative example having no cut-out portion in the taper worked portion. Moreover, if the examples 1–5 are compared with each other, the following results are understood. In the example 1 in which a length of the cut-out portion is 0.1 mm, the wrinkle portion are detected partly at the peripheral portion and the ISO strength is low as is the same as the comparative example. In the example 5 in which a length of the cut-out portion is 1.5 mm, a connection performance between the outer wall and the cell is sometimes low while no wrinkle portions are detected at the peripheral portion and the ISO strength is low as is the same as the comparative example. On the other hand, in the examples 2–4, no wrinkle portions are detected and the ISO strength is high. Therefore, it is preferred to set the lengths of the horizontal surface and the vertical surface in the cut-out portion to 0.2–1.0 mm.

As is clearly understood from the above explanation, according to the invention, since the cut-out portion is arranged in the taper worked portion of the outer peripheral portion of the die, it is possible to reduce a pressure of the batch moving between the taper worked portion and the control plate by means of the cut-out portion. As a result, it is possible to make a stress applied to the rib small even if a thickness of the outer wall is designed thick, and thus it is possible to obtain the ceramic honeycomb structural body in which the wrinkle portions are not generated and the outer wall is thick.

What is claimed is:

1. A die for manufacturing honeycomb bodies including batch supply holes which are opened to a backside surface of the die, slit channels which are communicated with the batch supply holes and are opened to a foreside surface of the die and a taper worked portion which is formed by working an outer peripheral portion of the foreside surface of the die in a taper manner, comprising at least one cut-out portion formed to the taper worked portion of the outer peripheral portion.

2. The die for manufacturing honeycomb bodies according to claim 1, wherein said cut-out portion is constructed in a longitudinal cross section by a horizontal surface along a radial direction of the die and a vertical surface along an axial direction of the die.

3. The die for manufacturing honeycomb bodies according to claim 2, wherein said taper worked portion has an angle of 45° with respect to a surface along a radial direction of the die, and said horizontal surface and vertical surface constituting said cut-out portion are 0.2–1.0 mm in a longitudinal cross section.

4. The die for manufacturing honeycomb bodies according to claim 1, wherein said cut-out portion is formed to the taper worked portion at a portion other then the slit channels.

5. The die for manufacturing honeycomb bodies according to claim 1, wherein said cut-out portion is formed to all of a circumference of the taper worked portion.

6. The die for manufacturing honeycomb bodies according to claim 1, wherein said cut-out portion is formed to a part of a circumference of the taper worked portion.

* * * * *